(12) United States Patent
Inuzuka et al.

(10) Patent No.: US 7,278,600 B2
(45) Date of Patent: Oct. 9, 2007

(54) SEAT BELT RETRACTOR AND SEAT BELT DEVICE

(75) Inventors: Koji Inuzuka, Shiga (JP); Koji Tanaka, Moriyama (JP)

(73) Assignee: Takata Corporation, Tokyo (JP)

( * ) Notice: Subject to any disclaimer, the term of this patent is extended or adjusted under 35 U.S.C. 154(b) by 223 days.

(21) Appl. No.: 10/848,079

(22) Filed: May 19, 2004

(65) Prior Publication Data

US 2005/0011983 A1   Jan. 20, 2005

(30) Foreign Application Priority Data

Jul. 14, 2003   (JP)   ............................. 2003-196594

(51) Int. Cl.
 *B60R 22/46* (2006.01)
(52) U.S. Cl. .................... 242/374; 242/390.8
(58) Field of Classification Search ............... 242/374, 242/382, 390.8, 390.9; 280/806, 807; 297/476, 297/477, 478, 480
See application file for complete search history.

(56) References Cited

U.S. PATENT DOCUMENTS

| | | | | |
|---|---|---|---|---|
| 4,858,953 | A | * | 8/1989 | Nishimura et al. ......... 280/807 |
| 5,181,739 | A | * | 1/1993 | Bauer et al. ................ 280/807 |
| 6,494,395 | B1 | * | 12/2002 | Fujii et al. .................. 242/374 |
| 6,499,554 | B1 | * | 12/2002 | Yano et al. ................. 180/268 |
| 6,626,463 | B1 | | 9/2003 | Arima et al. |
| 2001/0004997 | A1 | | 6/2001 | Yano et al. |
| 2001/0030255 | A1 | | 10/2001 | Arima et al. |
| 2002/0017584 | A1 | | 2/2002 | Specht |
| 2003/0116669 | A1 | | 6/2003 | Fujii et al. |

FOREIGN PATENT DOCUMENTS

| | | |
|---|---|---|
| JP | 58-139845 | 8/1983 |
| JP | 2000-177535 | 6/2000 |
| JP | 2001-114070 | 4/2001 |
| JP | 2004-224263 | 12/2004 |

* cited by examiner

*Primary Examiner*—Peter M. Cuomo
*Assistant Examiner*—Scott Haugland
(74) *Attorney, Agent, or Firm*—Manabu Kanesaka

(57) ABSTRACT

A seat belt retractor includes a spool for winding up a seat belt; a motor for generating rotational torque to rotate the spool; and a power transmission mechanism for transmitting the rotational torque of the motor to the spool. The seat belt retractor winds the seat belt on the spool with the rotational torque of the motor. The power transmission mechanism has a low reduction ratio transmission mode in which the rotational torque of the motor is transmitted to the spool through a low reduction ratio mechanism, and a high reduction ratio transmission mode in which the rotational torque of the motor is transmitted to the spool through a high reduction ratio mechanism. The seat belt retractor further includes a power transmission mode switching mechanism for selecting between the low reduction ratio transmission mode and the high reduction ratio transmission mode.

2 Claims, 7 Drawing Sheets

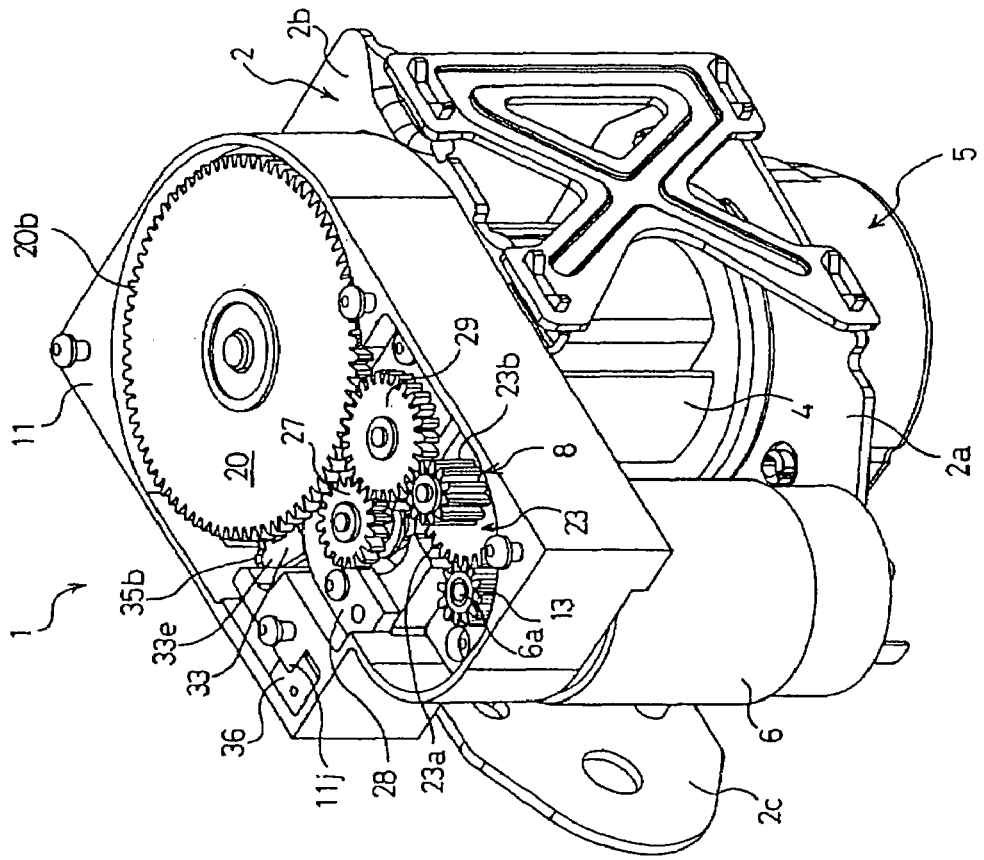
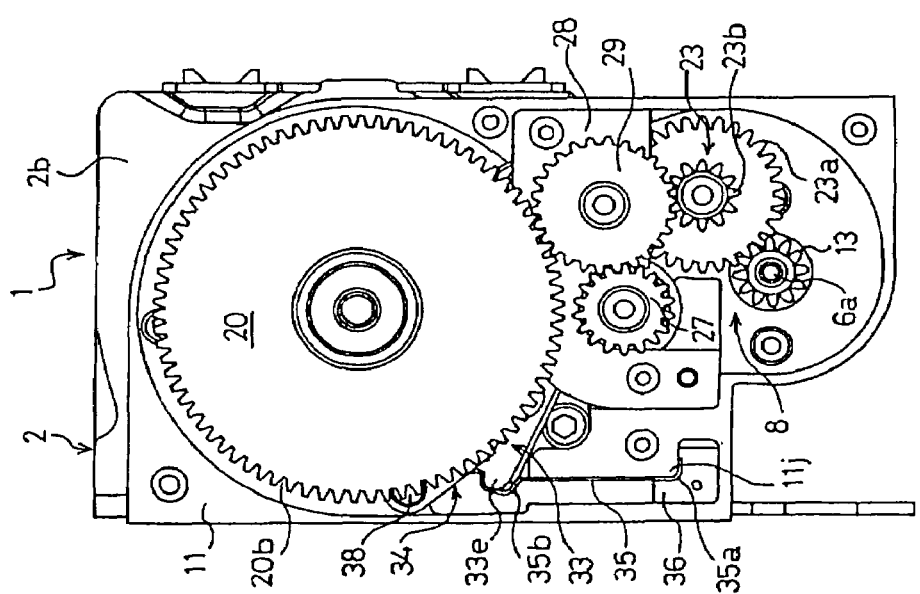
Fig. 2(a)
Fig. 2(b)

SEAT BELT RETRACTOR AND SEAT BELT DEVICE

BACKGROUND OF THE INVENTION AND RELATED ART STATEMENT

The present invention relates to a seat belt retractor installed in a vehicle such as an automobile for winding a seat belt onto a spool by a motor to restrain and protect an occupant and, more particularly, to a seat belt retractor for winding a seat belt efficiently by a motor using limited power. The present invention also relates to a seat belt device provided with the seat belt retractor.

Conventionally, a seat belt device installed in a vehicle such as an automobile prevents an occupant from jumping out of a vehicle seat by restraining the occupant with a seat belt thereof, thereby protecting the occupant in the event of emergency such as a vehicle collision at which large deceleration is exerted on the vehicle.

The seat belt device is provided with a seat belt retractor for winding up the seat belt. The seat belt retractor comprises urging means such as a spiral spring for urging a spool with the seat belt wound thereon in a belt-winding direction. When the seat belt is not used, the seat belt is fully wound on the spool by the urging force of the urging means. When the occupant puts on the seat belt, the seat belt is withdrawn against the urging force of the urging means to extend across the occupant. In the seat belt retractor, a locking mechanism is activated in the event of emergency as mentioned above to stop the rotation of the spool in an unwinding direction, thereby preventing the seat belt from being withdrawn. Therefore, the seat belt can securely restrain and protect the occupant.

As a conventional seat belt device as mentioned above, a motorized seat belt retractor has been proposed in which, when an unavoidable collision is detected before a vehicle collision, the tension on the seat belt is increased by increasing the driving force of the motor to wind up the seat belt, thereby increasing the restraint force of the occupant. When the vehicle collision is actually detected, a gas generator for a pretensioner is actuated to generate gas, so that the seat belt is rapidly wound up with the generated gas, thereby further increasing the restraint force of the occupant (see Japanese Patent Publication (Kokai) No. 2000-95064).

Japanese Patent Publication (Kokai) No. 2000-177535 has disclosed a seat belt retractor in which the belt tension is controlled. The seat belt retractor is provided with power transmission passages for transmitting the rotational torque of the motor, i.e. a first power transmission passage for transmitting the rotational torque of the motor to urging means to increase the force of the urging means and a second power transmission passage for transmitting the rotational torque of the motor at a fixed reduction ratio. The first power transmission passage is selected when a first solenoid is actuated, and the second power transmission passage is selected when a second solenoid is actuated.

It is necessary to wind up the seat belt with various modes such as a mode for rapidly winding up the seat belt for removing a slack of the seat belt or storing the seat belt and a mode for winding up the seat belt with large rotational torque for restraining the occupant. The rotational speed of the spool and the belt winding torque on the spool depend on the mode of winding up the seat belt.

In the seat belt retractor disclosed in Japanese Patent Publication (Kokai) No. 2000-95064, the power transmission mechanism transmitting the driving force of the motor to the spool has only one power transmission passage with a fixed reduction ratio. Accordingly, the reduction ratio is limited so that it is difficult to flexibly and effectively obtain various rotational speeds of the spool and various belt winding torques on the spool.

It is possible to control the rotational speed of the motor and the winding-up force of the spool through a fine control system. However, it is difficult to control the motor through such a fine control system, and the power consumption increases. It is necessary to increase the rotational torque of the motor in order to obtain large restraining force in the event of emergency such as a vehicle collision. However, when the rotational torque of the motor increases, the power consumption increases or a size of the motor increases.

In the seat belt retractor disclosed in Japanese Patent Publication (Kokai) No. 2000-177535, one power transmission passage is provided for transmitting the rotational torque of the motor to the urging means to control the urging force of the urging means, while the other transmission passage is provided for transmitting the rotational torque of the motor to the spool to directly control the winding-up force of the spool with the rotational torque of the motor. While the seat belt retractor is provided with the two different power transmission passages with the different speed reduction ratios, only one power transmission passage with a fixed reduction ratio is provided for directly transmitting the rotational torque of the motor to the spool. Accordingly, similarly to the device disclosed in Japanese Patent Publication (Kokai) No. 2000-95064, the reduction ratio is limited so that it is difficult to flexibly and effectively obtain various rotational speeds of the spool and various belt winding torques on the spool.

In the seat belt retractor, it is possible to control the belt winding force to some extent through the control of the urging force of the urging means with the rotational torque of the motor so as to control the belt winding force of the spool according to the controlled urging force. However, it is preferable to control the winding force of the spool more accurately by effectively utilizing the rotational torque of the motor.

In view of the problems described above, the present invention has been made, and an object of the present invention is to provide a seat belt retractor with a compact structure in which power consumption of a motor is reduced and control of the motor is simple, wherein the seat belt retractor effectively achieves two winding modes, i.e. a mode for rapidly winding up the seat belt for removing slack of the seat belt or for storing the seat belt, and a mode for winding up the seat belt with large winding force for restraining the occupant. Another object of the present invention is to provide a seat belt device provided with the seat belt retractor.

Further objects and advantages of the invention will be apparent from the following description of the invention.

SUMMARY OF THE INVENTION

In order to achieve the objects described above, according to a first aspect of the present invention, a seat belt retractor includes a spool for winding up a seat belt; a motor for generating rotational torque to rotate the spool; and a power transmission mechanism for transmitting the rotational torque of the motor to the spool. The seat belt retractor winds the seat belt on the spool with the rotational torque of the motor. The power transmission mechanism has a low reduction ratio transmission mode in which the rotational torque of the motor is transmitted to the spool through a low reduction ratio mechanism and a high reduction ratio transmission mode in which the rotational torque of the motor is transmitted to the spool through a high reduction ratio mechanism. The seat belt retractor further includes a power transmission mode switching mechanism for selecting between the low reduction ratio transmission mode and the high reduction ratio transmission mode.

According to a second aspect of the present invention, the power transmission mode switching mechanism selects between the low reduction ratio transmission mode and the high reduction ratio transmission mode according to tension of the seat belt.

According to a third aspect of, the present invention, the power transmission mode switching mechanism sets the power transmission mechanism in the low reduction ratio transmission mode when the tension of the seat belt is less than a predetermined value, and sets the power transmission mechanism in the high reduction ratio transmission mode when the tension of the seat belt is larger than the predetermined value.

According to a fourth aspect of the present invention, the power transmission mechanism has a power transmission blocking mode in which the rotational torque of the motor is not transmitted to the spool. The power transmission mode switching mechanism selects one of the low reduction ratio transmission mode, the high reduction ratio transmission mode, and the power transmission blocking mode.

According to a fifth aspect of the present invention, the power transmission mode switching mechanism selectively sets the power transmission mechanism in one of the low reduction ratio transmission mode and the high reduction ratio transmission mode according to the tension of the seat belt, and sets the power transmission mechanism in the power transmission blocking mode according to the rotation of the motor in the belt unwinding direction.

According to a sixth aspect of the present invention, the power transmission mode switching mechanism sets the power transmission mechanism in the low reduction ratio transmission mode when the tension of the seat belt is less than a predetermined value, and sets the power transmission mechanism in the high reduction ratio transmission mode when the tension of the seat belt is larger than the predetermined value.

According to a seventh aspect of the present invention, the high reduction ratio mechanism comprises a planetary gear train having a sun gear for receiving the rotational torque of the motor, an internal gear, a predetermined number of planet gears engaging the sun gear and the internal gear, a carrier connected to the spool to rotate together for supporting the planet gears. The low reduction ratio mechanism comprises a gear mechanism having a small-diameter gear for receiving the rotational torque of the motor and a large-diameter gear connected to the spool to rotate together. The large-diameter gear engages the small-diameter gear, and has a diameter larger than that of the small-diameter gear.

According to an eighth aspect of the present invention, the carrier and the large-diameter gear are composed of a common carrier gear.

According to a ninth aspect of the present invention, the internal gear is rotatably disposed. The power transmission mode switching mechanism cancels the high reduction ratio transmission mode by allowing the internal gear to freely rotate according to the low rotational torque of the motor in one direction. The power transmission mode switching mechanism sets the low reduction ratio transmission mode by engaging the small-diameter gear with the large-diameter gear. The power transmission mode switching mechanism sets the high reduction ratio transmission mode by stopping the rotation of the internal gear according to the high rotational torque of the motor in one direction, and cancels the low reduction ratio transmission mode by disengaging the small-diameter gear from the large-diameter gear.

According to a tenth aspect of the present invention, a seat belt device includes the seat belt retractor described above, a seat belt, a tongue for passing the seat belt, and a buckle for engaging the tongue.

In the seat belt retractor with the structure according to the first to ninth aspects of the invention, the power transmission mechanism has the low reduction ratio transmission mode and the high reduction ratio transmission mode. When the low reduction ratio transmission mode is set, the high-speed and low-torque power transmission passage is established in the power transmission mechanism. Therefore, the rotational torque of the motor can be transmitted to the spool at a high speed and with low torque, thereby quickly winding the seat belt for removing slack of the seat belt or for storing the seat belt.

When the high reduction ratio transmission mode is set, the low-speed and high-torque power transmission passage is established in the power transmission mechanism. Therefore, the rotational torque of the motor can be transmitted to the spool at a low speed and with high torque, thereby winding the belt with high torque for restraining the occupant. In the seat belt retractor, it is possible to obtain the two winding modes. Accordingly, it is possible to effectively perform flexible and simple control according to the performance required for winding up the seat belt without controlling the rotational torque of the motor.

The two power transmission passages are provided, so that the rotational torque of the motor is efficiently transmitted to the spool, thereby performing the two winding modes with limited power consumption. The seat belt is wound with the high torque for restraining the occupant through the low-speed and high-torque power transmission passage, there by reducing the rotational torque of the motor required as compared with a conventional device. Accordingly, it is possible to reduce the power consumption of the motor and allows the use of a smaller motor, thereby making the seat belt retractor compact. The seat belt retractor has the two winding modes to obtain a function of pre-tensioning the seat belt with the rotational torque of the motor.

In the seat belt retractor according to the second, third, fifth and sixth aspects of the invention, the power transmission mechanism is set in the low reduction ratio transmission mode or in the high reduction ratio transmission mode according to the tension of the seat belt. It is easy to switch the modes without controlling the rotational torque of the motor. In the fourth aspect of the invention, the power transmission mechanism has the power transmission blocking mode in which the rotational torque of the motor is not transmitted to the spool. Accordingly, it is possible to withdraw the seat belt, use the seat belt without discomfort, and store the seat belt when not used without an influence of the motor.

In the seventh aspect of the invention, the high reduction ratio mechanism is composed of the planetary gear train, thereby reducing sizes of the low-speed and high-torque transmission passage. Therefore, even though the power transmission mechanism has the low reduction ratio transmission mode and the high reduction ratio transmission mode, the seat belt retractor can be made compact.

In the eighth aspect of the invention, a part of the components of the low reduction ratio mechanism and a part of the components of the high reduction ratio mechanism are composed of a common part, thereby reducing the number of parts and making the seat belt retractor compact.

In the ninth aspect of the invention, the power transmission mode switching mechanism controls the rotation of the internal gear of the planetary gear train and the engagement between the small-diameter gear and the large-diameter gear, thereby making it easy to switch the power transmission modes.

BRIEF DESCRIPTION OF THE DRAWINGS

FIGS. 2(a) and 2(b) are views showing the seat belt retractor shown in FIG. 1 in a state that a retainer cover is removed, wherein FIG. 2(a) is a perspective view thereof and FIG. 2(b) is a left side view thereof;

FIGS. 3(a) and 3(b) are views showing a sun gear member in the seat belt retractor shown in FIG. 1, wherein FIG. 3(a) is a perspective view thereof and FIG. 3(b) is a perspective view seen from a arrow direction 3(b) in FIG. 3(a);

DETAILED DESCRIPTION OF PREFERRED EMBODIMENTS

Figure 1:
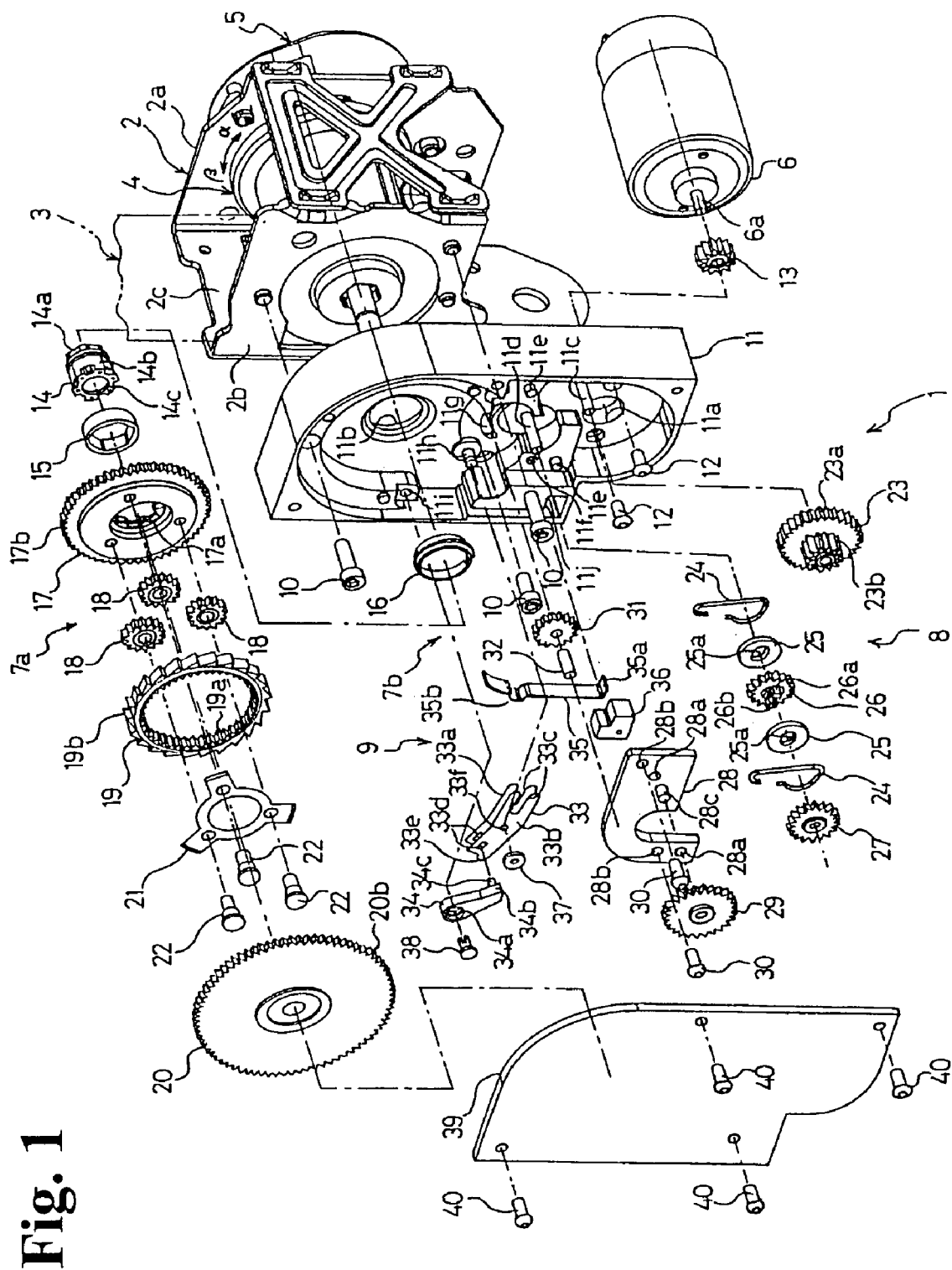
FIG. 1 is an exploded perspective view showing a seat belt retractor according to an embodiment of the present invention.

Hereinafter, embodiments of the present invention will be described with reference to the accompanying drawings. FIG. 1 is an exploded perspective view showing a seat belt retractor according to an embodiment of the present invention. FIGS. 2(a) and 2(b) are views showing the seat belt retractor shown in FIG. 1 in a state that a retainer cover is removed, wherein FIG. 2(a) is a perspective view thereof and FIG. 2(b) is a left side view thereof. In the following description, right and left represent right and the left in the drawings, and clockwise and counterclockwise represent clockwise and counterclockwise directions in the drawings unless stated otherwise.

As shown in FIG. 1, a seat belt retractor 1 mainly comprises a frame 2; a seat belt 3 for restrains an occupant as needed; a spool 4 for winding up the seat belt 3; a locking means 5 disposed on one side of the frame 2 to be actuated when deceleration larger than a predetermined value is generated upon a collision and the like for stopping the rotation of the spool 4 in a belt unwinding direction α; a motor 6 for generating driving torque to be applied to the spool 4; a power transmission gear mechanism 8 having a high reduction ratio mechanism 7a for reducing a rotational speed of the motor 6 at a relatively high speed reduction ratio before being transmitted to the spool 4 and a low reduction ratio mechanism 7b for reducing the rotational speed of the motor 6 at a relatively low speed reduction ratio before being transmitted to the spool 4, and having a first power transmission passage and a second power transmission passage so that the rotational torque of the motor 6 is transmitted to the spool selectively through one of the first power transmission passage and the second power transmission passage; and a power transmission mode switching mechanism 9 for selectively switching and setting the power transmission gear mechanism 8 between the first power transmission passage and the second power transmission passage.

The frame 2 comprises a pair of parallel sidewalls 2a and 2b, and a back plate 2c connecting the sidewalls 2a and 2b. The spool 4 is rotatably arranged between the sidewalls 2a and 2b in the frame 2 for winding up the seat belt 3. The spool 4 may be a conventional spool in a conventional seat belt retractor.

The locking means 5 is mounted on the sidewall 2a. Similarly, the locking means 5 may be a conventional locking in a conventional seat belt retractor. The locking means 5 is designed to be actuated to stop the rotation of the spool 4 in the belt unwinding direction α when a vehicle sensor (deceleration sensor) detects deceleration larger than a predetermined value acting on a vehicle or when a webbing sensor (belt withdrawing speed sensor) detects a speed higher than a predetermined speed of withdrawing the seat belt 3.

A force limiter mechanism (not shown, energy absorbing mechanism, hereinafter referred to as EA mechanism) is arranged between the spool 4 and the locking means 5 for limiting the load on the seat belt 3 when the withdrawing of the seat belt 3 is stopped by the locking mechanism 5. The EA mechanism may be composed of a conventional torsion bar. When the withdrawing of the seat belt 3 is stopped by the locking means 5, the torsion bar is twisted and deformed, thereby limiting the load on the seat belt 3 and absorbing impact energy.

As shown in FIG. 1 and FIG. 2(a), a retainer 11 is mounted on the other sidewall 2b of the frame 2 with three screws 11, and the motor 6 is mounted on the retainer 11 at a mounting side to the frame 2 with a pair of screws 12. The motor 6 has a rotary shaft 6a passing through a through hole 11a of the retainer 11 and protruding toward a side opposite to a side of the retainer 11 facing the frame 2, and a motor gear 13 having external teeth is attached to the rotary shaft 6a so that the motor gear 13 rotates together with the rotary shaft 6a.

As shown in FIG. 1, a connector 14 is disposed among the spool 4, the EA mechanism (for example, a torsion bar) as mentioned above, and the speed reduction mechanisms 7a and 7b for connecting the spool 4 and the speed reduction mechanisms 7a and 7b in the rotational direction. The connector 14 comprises a first rotational connecting portion 14a for connecting the spool 4 and the EA mechanism in the rotational direction; a second rotational connecting portion 14b for connecting a connector-side bush 17 in the rotational direction; and a third rotational connecting portion 14c formed in a spline shape for connecting the speed reduction mechanisms 7a and 7b in the rotational direction.

The first rotational connecting portion 14a is formed in a polygonal cylindrical shape (not clearly shown in FIG. 1). An outer periphery of the rotational connecting portion 14a is connected to the spool 4 so that the connector 14 rotates together with the spool 4. An inner periphery of the rotational connecting portion 14a is connected to the EA mechanism (for example, a torsion bar) so that the connector 14 rotates together with the EA mechanism. Incidentally, the connecting structure for allowing the connector 14 and the spool 4 and the EA mechanism to rotate together is well known, and the description thereof is omitted.

An outer periphery of the second rotational connecting portion 14b is formed in a polygonal section, and an inner periphery of the connector-side bush 15 is also formed in a polygonal section. The connector-side bush 15 is fitted to the second connecting portion 14b so that the connector-side bush 15 is connected to the second rotational connecting portion 14b not to allow the relative rotation therebetween. The connector-side bush 15 is supported on the retainer-side bearing 16 fitted in the bore lib of the retainer 11 not to allow the relative rotation therebetween. Accordingly, the connector 14 is rotatably supported on the retainer 11. The third rotational connecting portion 14c is provided with a predetermined number of engaging grooves such as spline grooves extending in the axial direction and evenly spaced apart in the circumferential direction.

The high reduction ratio mechanism 7a comprises a ring-like carrier gear 17, a predetermined number of (three in the embodiment) planet gears 18 rotatably attached to the carrier gear 17, an annular ring member 19, and a sun gear member 20. The inner periphery 17a of the carrier gear 17 is provided with a predetermined number of engaging grooves such as spline grooves extending in the axial direction and evenly spaced apart in the circumferential direction at a side thereof facing the connector 14. The engaging grooves formed in the inner periphery 17a engage with ridges between the engaging grooves of the third rotational connecting portion 14c of the connector 14. The engaging grooves of the third rotational connecting portion 14c of the connector 14 engage ridges between the engaging grooves formed in the inner periphery 17a (similar to spline mesh). Accordingly, the carrier gear 17 is connected to the connector 14 not to allow the relative rotation therebetween so that the carrier gear 17 rotates together with the connector 14. The carrier gear 17 has external teeth 17b formed on the outer periphery thereof.

The planet gears 18 are rotatably attached to the carrier gear 17 with seed reduction pins 22 through a speed reduction plate 21. The ring member 19 has an internal gear 19a formed on the inner periphery thereof and ratchet teeth 19b formed on the outer periphery thereof. The internal gear 19a and the ratchet teeth 19b rotate together.

Figure 3B:
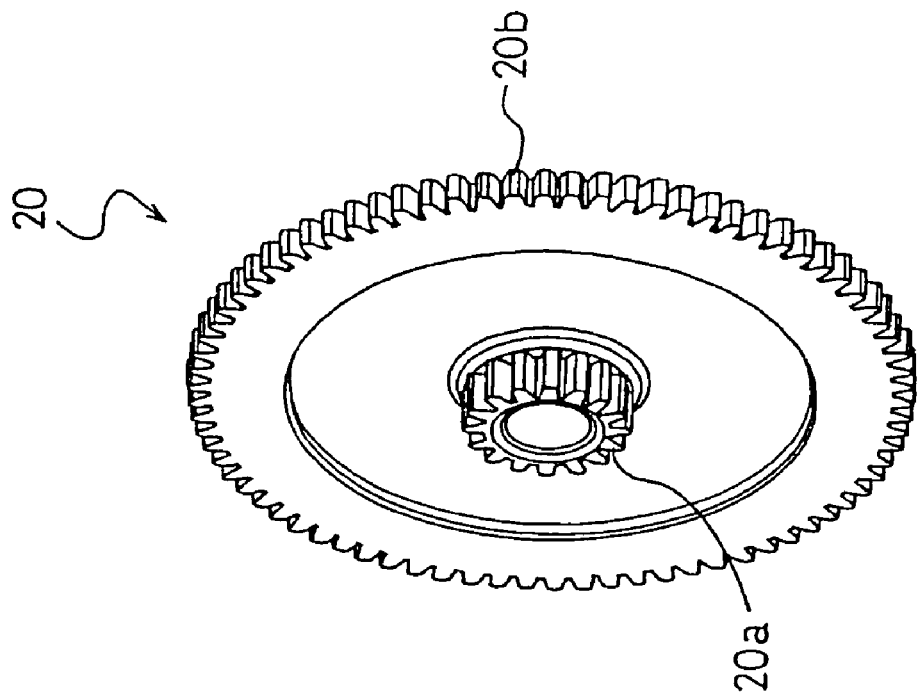
Figure 3A:
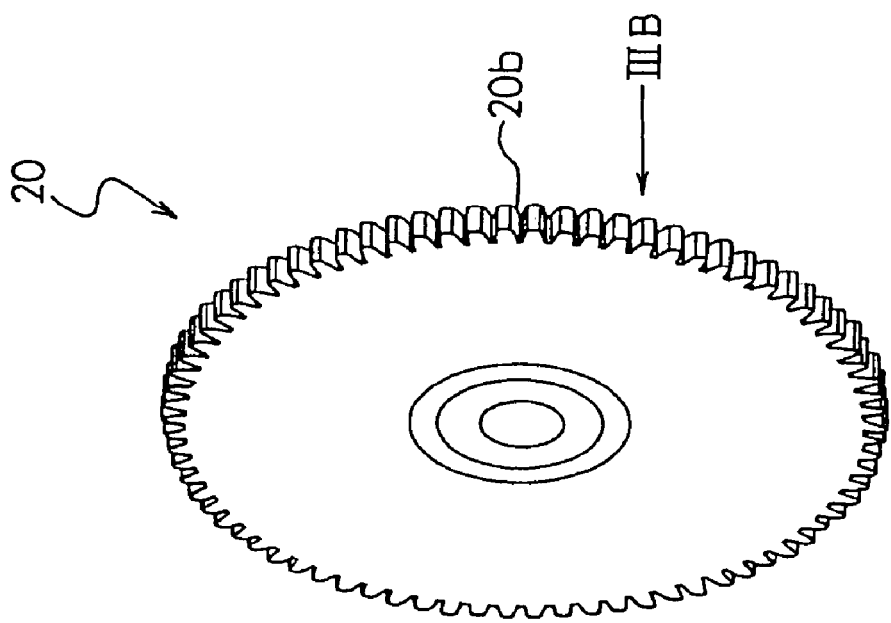

The sun gear member 20 has a sun gear 20a composed of a small-diameter external gear and a large-diameter external gear 20b rotating together as shown in FIGS. 3(a) and 3(b). The planet gears 18 supported with the carrier gear 17 always engages the sun gear 20a and the internal gear 19a, thereby forming a planetary gear train. The speed reduction mechanism 7 is the planetary gear train with the sun gear 20a as an input side and the carrier gear 17 as an output side.

As shown in FIG. 1, the power transmission mechanism 8 further comprises a connecting gear 23; a pair of clutch springs 24; a pair of pulleys 25; a lower-side connecting gear 26 having external teeth; an upper-side connecting gear 27 having external teeth; a guide plate 28; and an idle gear 29 having external teeth. The connecting gear 23 is rotatably supported on a rotary shaft 11c protruding from the retainer 11 and comprises a first connecting gear 23a composed of a large external gear and a second connecting gear 23b composed of a small gear. The first connecting gear 23a and the second connecting gear 23b rotate together. The large-diameter first connecting gear 23a always engages the motor gear 13 as shown in FIGS. 2(a) and 2(b).

As shown in FIG. 1, the lower-side connecting gear 26 has rotary shafts 26a projecting from side surfaces thereof (only one of the rotary shafts 26a is shown in FIG. 1) and a through hole 26b penetrating the rotary shafts 26a in the axial direction. Each of the rotary shafts 26a has a flat portion, and is fitted in an elongated hole 25a formed in each of the pulleys 25 such that an inner periphery of the elongated hole extends along a plane of the flat portion. Therefore, the pulleys 25 are disposed on the side surfaces of the lower-side connecting gear 26, respectively, such that the pulleys 25 rotate together with the lower-side connecting gear 26. Each of the clutch springs 24 has a first curved portion 24a engaging each of the pulleys 25. Further, the upper-side connecting gear 27 is supported on one of the rotary shafts 26a of the lower-side connecting gear 26 such that the upper-side connecting gear 27 rotates together with the lower-side connecting gear 26. The pulleys 25, the lower-side connecting gear 26, and the upper-side connecting gear 27 are rotatably supported on a rotary shaft lid standing on the retainer 11.

The guide plate 28 is attached to the retainer 11 with a pair of screws 30 screwed into a pair of tapped holes lid formed in the retainer 11 through corresponding holes 28b of the guide plate 28 in a state that a pair of supporting shafts lie is fitted into a pair of holes 28a of the guide plate 28. The idle gear 29 is rotatably supported on a rotary shaft 28c standing on the guide plate 28. As shown in FIGS. 2(a) and 2(b), the idle gear 29 always engages the external teeth 20b of the sun gear member 20, the small-diameter second connecting gear 23b of the connecting gear 23, and the upper-side connecting gear 27.

The low reduction ratio mechanism 7b comprises the upper-side connecting gear 27; the lower-side connecting gear 26; a clutch gear 31; and the carrier gear 17. Therefore, the rotational torque of the motor 6 transmitted to the idle gear 29 is transmitted from the idle gear 29 to the spool 4 through the low reduction ratio mechanism 7b or is transmitted from the idle gear 29 to the spool 4 through the high reduction ratio mechanism 7a.

Figure 5:
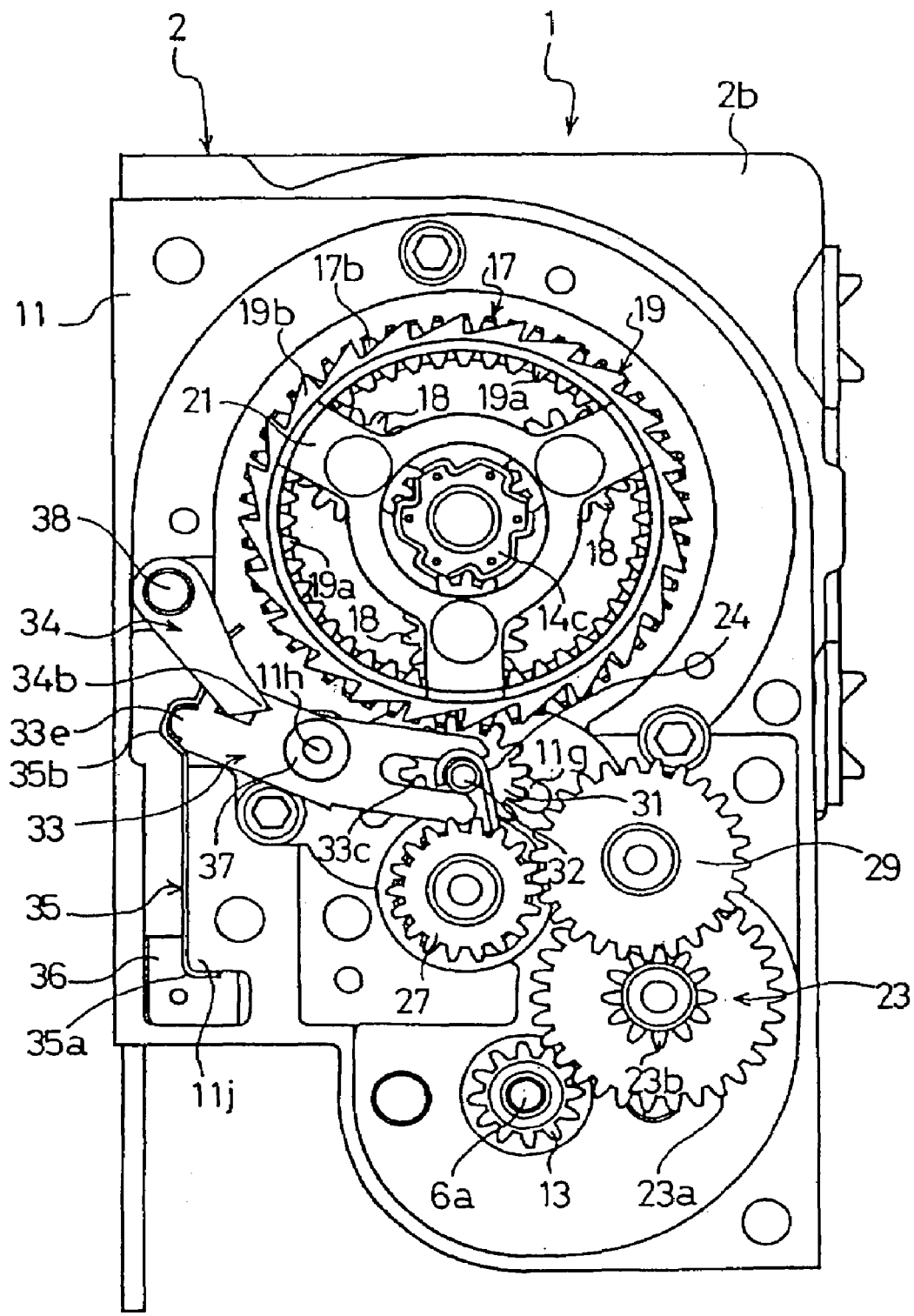
FIG. 5 is a left side view showing the seat belt retractor shown in FIG. 1 in a low reduction ratio transmission mode and in a state that some components thereof are removed.

As shown in FIG. 1, the power transmission mode switching mechanism 9 comprises the clutch gear 31 having external teeth; a rotary shaft 32; a clutch arm 33; a clutch pawl 34; a friction spring 35; and a spring stopper 36. As shown in FIG. 5, the clutch gear 31 engages the external teeth 17b of the carrier gear 17 with a diameter larger than that of the clutch gear 31, and always engages the lower-side connecting gear 26 (not shown). The rotary shaft 32 penetrates the center hole 31a of the clutch gear 31, thereby supporting the clutch gear 31 to be rotatable.

The clutch arm 33 has a U-like cross section formed of sidewalls 33a and 33b, and a bottom (not shown) thereof. The sidewalls 33a and 33b have projecting portions at lower sides thereof, and have linear supporting grooves 33c formed in the projecting portions, respectively. The clutch gear 31 is disposed between the projecting portions of the sidewalls 33a and 33b. Rotary shafts 32 projecting from both surfaces of the clutch gear 31 are supported on the corresponding supporting grooves 33c to be slidable along the supporting grooves. Further, second curved portions 24b of the clutch springs 24 are hooked on the projecting portions of the rotary shafts 32 projecting from the sidewalls 33a, 33a.

One end of the rotary shaft 32 is fitted into and supported by a guide hole 119 formed in the retainer 11. The guide hole 11g is formed in an arc shape as a portion of a circle about the rotary shaft 11d. The rotary shaft 32 is guided along the guide hole 11 so that the rotary shaft 32 can move along the circumference of the circle about the rotary shaft 11d. The sidewalls 33a and 33b are provided with elongated holes 33d and substantially arc-shape engaging portions 33e at the other ends thereof, respectively. The sidewalls 33a and 33b are provided with supporting holes 33f formed at the center thereof in the longitudinal direction. A supporting shaft 11*h* standing on the retainer 11 is inserted into the supporting holes 33*f* to pivotally support the clutch arm 33 and an E ring 37 is fixed to the supporting shaft 11*h*, so that the clutch arm 33 does not come off.

Figure 4:
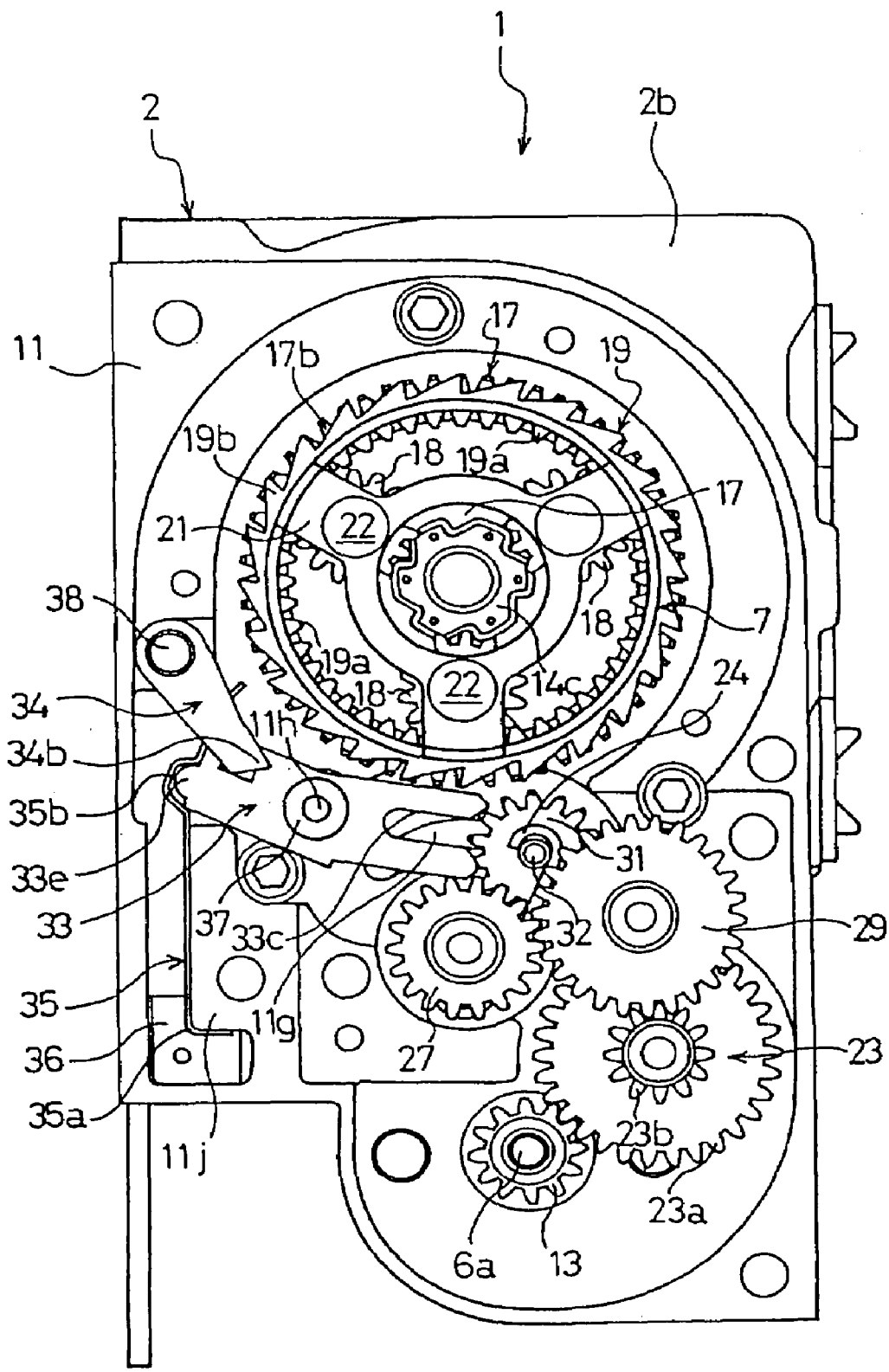
FIG. 4 is a left side view showing the seat belt retractor shown in FIG. 1 in a power transmission blocking mode and in a state that some components thereof are removed.
Figure 6:
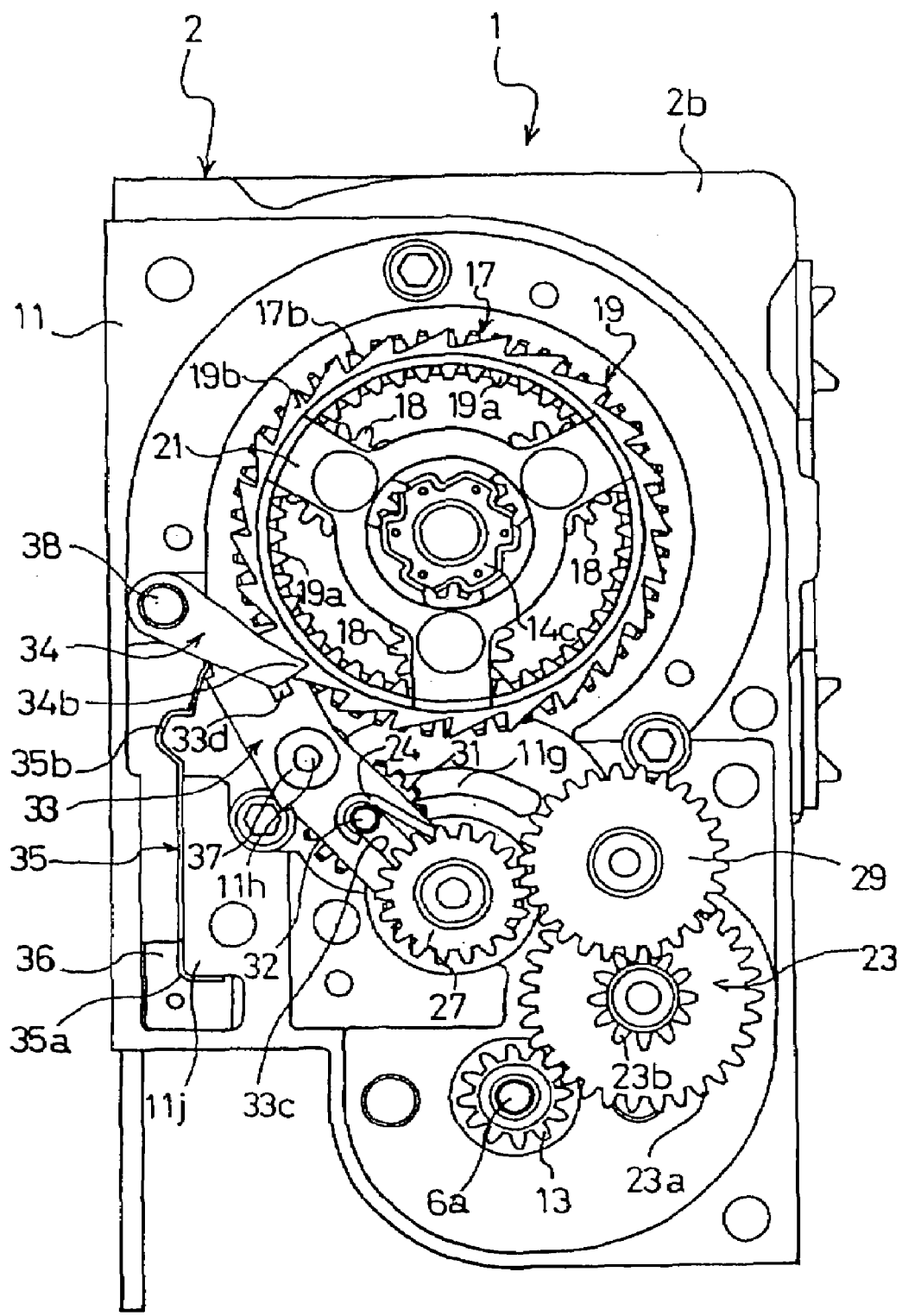
FIG. 6 is a left side view showing the seat belt retractor shown in FIG. 1 in a high reduction ratio transmission mode and in a state that some components thereof are removed.

The clutch pawl 34 is provided with a supporting hole 34*a* at one end side thereof and an engaging hook 34*b* at the other end side thereof. Further, the clutch pawl 34 is provided with an engaging pin 34*c* at the other end side thereof, i.e. the engaging hook 34*b* side. The engaging pin 34*c* is fitted into the elongated holes 33*d* of the clutch arm 33 so that the engaging pin 34*c* can rotate relative to the clutch arm 33 and move along the elongated holes 33*d*. As shown in FIG. 4, the clutch pawl 34 is pivotally attached to the retainer 11 by inserting and fitting the pawl pin 38 through the supporting hole 34*a* into the pin hole 11*i* of the retainer 11. As shown in FIG. 6, the engaging hook 34*b* can engage one of the ratchet teeth 19*b* of the ring member 19 rotating in a clockwise direction (corresponding to the belt winding direction α of the spool 4). When the engaging hook 34*b* engages one of the ratchet teeth 19*b*, the rotation of the ring member 19 in the clockwise direction is stopped.

The friction spring 35 is composed of a band plate spring and has a supporting portion 35*a* formed in an L shape at a lower end thereof and has a U-like concave portion 35*b* above the center thereof in the longitudinal direction. A flat portion is formed between the concave portion 35*b* and the lower supporting portion 35*a*, and a curved portion is formed between the concave portion 35*b* and the upper end. The engaging portion 33*e* of the clutch arm 33 engages and disengages from the concave portion 35*b*. As shown in FIG. 4, in a state that the engaging portion 33*e* engages the concave portion 35*b*, the extending direction of the supporting grooves 33*c* becomes the tangential direction of the arc of the guide hole 11*g*, so that the rotary shaft 32 moves from the guide hole 11*g* to the supporting grooves 33*c* and from the supporting grooves 33*c* to the guide hole 11*g*.

The spring stopper 36 is formed in an L shape. The supporting portion 35*a* is sandwiched between the spring stopper 36 and the spring mounting portion 11*j* formed on the retainer 11, thereby supporting the friction spring 35 at a one side thereof (like a cantilever) with the upper end being a free end. In a state that the speed reduction mechanism 7, the power transmission gear mechanism 8, and the power transmission mode switching mechanism 9 are assembled in a concave portion formed in a surface of the retainer 11 opposite to the surface attached to the frame 2, a retainer cover 39 is put on the face, on which the respective components are assembled, of the retainer 11 with a predetermined number (four in the illustrated example) of screws 40 so as to cover the components.

The power transmission gear mechanism 8 with the aforementioned structure has the following three power transmission modes.

(1) Power Transmission Blocking Mode

As shown in FIG. 4, in the power transmission blocking mode, the engaging portion 33*e* of the clutch arm 33 in the power transmission mode switching mechanism 9 engages the concave portion 35*b* of the friction spring 35. In the state that the engaging portion 33*e* engages the concave portion 35*b*, the engaging hook 34*b* of the clutch pawl 34 disengages from the ratchet teeth 19*b* of the ring member 19, so that the ring member 19 freely rotates. Accordingly, the torque transmission passage (low-speed and high-torque transmission passage, described later) between the sun gear member 20 and the carrier gear 17 is shut off.

The rotary shaft 32 contacts the right end of the guide hole 11*g* so that the clutch gear 31 is set at the right-most position. At the right-most position, the clutch gear 31 is spaced apart from the external teeth 17*b* of the carrier gear 17. Accordingly, the torque transmission passage (high-speed and low-torque transmission passage, described later) between the clutch gear 31 and the carrier gear 17 is shut off. Therefore, in the power transmission blocking mode, the spool 4 is not connected to the motor 6 so that the rotational torque of the motor 6 is not transmitted to the spool 4 and the rotational torque of the spool 4 is also not transmitted to the motor 6.

(2) Low Reduction Ratio Transmission Mode

As shown in FIG. 5, in the low reduction ratio transmission mode, the engaging portion 33*e* of the clutch arm 33 engages the concave portion 35*b* of the friction spring 35 as in the power transmission blocking mode. In the state that the engaging portion 33*e* engages the concave portion 35*b*, the engaging hook 34*b* of the clutch pawl 34 disengages from the ratchet teeth 19*b* of the ring member 19 so that the ring member 19 freely rotates. Accordingly, the low-speed and high-torque transmission passage between the sun gear member 20 and the carrier gear 17 is shut off.

The rotary shaft 32 is set at the highest position (position closest to the rotary shaft of the spool 4) at the center of the guide hole 11*g* so that the clutch gear 31 is set at the highest position (position closest to the rotary shaft of the spool 4). At the highest position, the clutch gear 31 engages the external teeth 17*b* of the carrier gear 17. Accordingly, the high-speed and low-torque transmission passage between the clutch gear 31 and the carrier gear 17 is established. That is, the motor 6 is connected to the spool 4 through the motor gear 13, the connecting gear 23, the idle gear 29, the upper-side connecting gear 27, the lower-side connecting gear 26, the clutch gear 31, the carrier gear 17, and the connector 14. Therefore, the power transmission passage for low-ratio speed reduction is established. At the highest position of the rotary shaft 32, the rotary shaft 32 enters the supporting grooves 33*c* of the clutch arm 33 and contacts the clutch arm 33.

As mentioned above, in the low reduction ratio transmission mode, the high-speed and low-torque transmission passage for low-ratio speed reduction is established, and the seat belt is quickly wound up by the driving of the motor 6.

(3) High Reduction Ratio Transmission Mode

As shown in FIG. 6, in the high reduction ratio transmission mode, the engaging portion 33*e* of the clutch arm 33 comes off the concave portion 35*b* of the friction spring 35, so that the engaging portion 33*e* is positioned at the curved portion above the concave portion 35*b* of the friction spring 35. In the state that the engaging portion 33*e* is out of the concave portion 35*b*, the engaging hook 34*b* of the clutch pawl 34 engages the ratchet teeth 19*b* of the ring member 19 in the clockwise direction, so that the rotation of the ring member 19 in the clockwise direction is stopped. Accordingly, the low-speed and high-torque transmission passage between the sun gear member 20 and the carrier gear 17 is established. That is, the motor 6 is connected to the spool 4 through the motor gear 13, the connecting gear 23, the idle gear 29, the external teeth 20*b* of the sun gear member 20, the sun gear 20*a*, the planet gear 18, the carrier gear 17, and the connector 14. Therefore, the power transmission passage for high-ratio speed reduction is established through the planetary gear train.

The rotary shaft 32 contacts the left end of the guide hole 11*g* so that the clutch gear 31 is set at the left-most position. At the left-most position, the clutch gear 31 is spaced apart from the external teeth 17b of the carrier gear 17. Accordingly, the high-speed and low-torque transmission passage between the clutch gear 31 and the carrier gear 17 is shut off.

As mentioned above, in the high reduction ratio transmission mode, the low-speed and high-torque transmission passage for high-ratio speed reduction is established, and the seat belt is wound up with the high belt tension through the driving of the motor 6.

The power transmission mode switching mechanism 9 switches the mode among the power transmission blocking mode, the low reduction ratio transmission mode, and the high reduction ratio transmission mode.

(1) Switching from the Power Transmission Blocking Mode to the Low Reduction Ratio Transmission Mode In the power transmission blocking mode shown in FIG. 4, when the motor 6 rotates in the normal direction (the rotary shaft 6a of the motor 6 rotates in the clockwise direction in FIG. 4; corresponding to the rotation of the spool 4 in the belt winding direction β), the lower-side connecting gear 26 and the pulleys 25 rotate in the direction corresponding to the belt winding direction β of the spool 4 through the motor gear 13, the connecting gear 23, the idle gear 29, and the upper-side connecting gear 27. The clutch gear 31 disengages from the external teeth 17b of the carrier gear 17, and runs idle. The rotary shaft 32 is not subjected to resistance so that the clutch spring 24 rotates in the same direction of that of the pulleys 25. Therefore, the clutch gear 31 and the rotary shaft 32 move to the left along the guide hole 11g, so that the rotary shaft 32 contacts the clutch arm 33 as shown in FIG. 5.

At the position where the rotary shaft 32 contacts the clutch arm 33, the clutch gear 31 and the rotary shaft 32 are set at the highest position as mentioned above, and the clutch gear 31 engages the external teeth 17b of the carrier gear 17 as shown in FIG. 5. Therefore, the rotation of the clutch gear 31 is transmitted to the carrier gear 17, so that the carrier gear 17 rotates. When the seat belt 3 has a slack, the seat belt 3 is wound on the spool 4 by the rotation of the carrier gear 17. When the slack of the seat belt 3 is wound, the spool 4 no longer rotates, so that the carrier gear 17 no longer rotates. Accordingly, the clutch gear 31 is subjected to resistance from the carrier gear 17, so that the clutch gear 31 also no longer rotates.

At this time, the lower-side connecting gear 26 is tried to rotate by the rotational torque of the motor 6, and force in the direction toward the left-most position is applied to the rotary shaft 32 by the rotational torque of the lower-side connecting gear 26. At this point, the rotary shaft 32 presses the clutch arm 33 with the force as the rotary shaft 32 contacts the clutch arm 33. Since the tension of the seat belt 3 is less than the predetermined value, the moment of rotating the clutch arm 33 in the clockwise direction by the pressing force of the rotary shaft 32 is smaller than moment against the moment in the clockwise direction by the engaging force between the engaging portion 33e and the concave portion 35b. Therefore, the engaging portion 33e does not come off the concave portion 35b, so that the clutch arm 33 does not rotate. Accordingly, the rotary shaft 32 stops at the position where the clutch arm 33 contacts the clutch arm 33.

When the rotary shaft 32 stops, the clutch gear 31 and the rotary shaft 32 are held at the highest position as shown in FIG. 5. When the clutch gear 31 is held at the highest position, the clutch gear 31 keeps engaging the external teeth of the carrier gear 17, and the high-speed and low-torque transmission passage between the clutch gear 31 and the carrier gear 17 is held. Since the clutch arm 33 does not rotate, the clutch pawl 34 also does not rotate, so that the engaging hook 34b is held at such a position not to engage the ratchet teeth 19b. Therefore, the ring member 19 becomes free to keep blocking the low-speed and high-torque transmission passage between the sun gear member 20 and the carrier gear 17.

In this manner, the power transmission mechanism 8 is switched from the power transmission blocking mode to the low reduction ratio transmission mode, so that the power transmission mechanism 8 is set in the low reduction ratio transmission mode.

(2) Switching from the Low Reduction Ratio Transmission Mode to the High Reduction Ratio Transmission Mode The high reduction ratio transmission mode is set through relatively high rotational torque of the motor 6. In this case, the high reduction ratio transmission mode is set from the power transmission blocking mode through the low reduction ratio transmission mode. The power transmission blocking mode is switched to the low reduction ratio transmission mode in the same way as mentioned above. When the high reduction ratio transmission mode is set, the tension of the seat belt 3 is larger than the predetermined value. Also, the moment applied to the clutch arm 33 by the pressing force of the rotary shaft 32 is larger than the moment against the moment in the clockwise direction by the engaging force between the engaging portion 33e and the concave portion 35b in the low reduction ratio transmission mode shown in FIG. 5. Therefore, the engaging portion 33e can come off the concave portion 35b.

When the clutch spring 24 further rotates in the counterclockwise direction, the rotary shaft 32 moves the clutch arm 33 to rotate about the supporting shaft 11h in the clockwise direction and moves to the left along the guide hole 11g. Accordingly, the clutch gear 31 moves to the left. When the rotary shaft 32 contacts the left end of the guide hole 11g, the rotary shaft 32 does not move further, so that the clutch gear 31, the rotary shaft 32, and the clutch spring 24 stop. Therefore, the clutch gear 31 and the rotary shaft 32 are set to the left-most position as shown in FIG. 6. At the left-most position, the clutch gear 31 disengages from the external teeth 17b of the carrier gear 17, so that the high-speed and low-torque transmission passage between the clutch gear 31 and the carrier gear 17 is blocked.

When the clutch arm 33 rotates, the clutch pawl 34 rotates about the clutch pawl pin 38 in the counterclockwise direction, so that the clutch pawl 34 is set at a position where the engaging hook 34b can engage the ratchet teeth 19b as shown in FIG. 6. Since the sun gear member 20 rotates with the rotational torque of the motor 6, and the ring member 19 also rotates in the clockwise direction, the ratchet teeth 19b engage the engaging hook 34b to stop the ring member 19. Accordingly, the low-speed and high-torque transmission passage between the sun gear member 20 and the carrier gear 17 is established.

In this manner, the power transmission mechanism 8 is switched from the low reduction ratio transmission mode to the high reduction ratio transmission mode, so that the power transmission mechanism 8 is set in the high reduction ratio transmission mode.

(3) Switching from the High Reduction Ratio Transmission Mode to the Power Transmission Blocking Mode (Through the High Reduction Ratio Transmission Mode)

In the high reduction ratio transmission mode shown in FIG. 6, when the motor 6 rotates in the reverse direction (rotary shaft 6a of the motor 6 rotates in the counterclockwise direction in FIG. 4; corresponding to the rotation of the spool 4 in the belt unwinding direction α), the lower-side clutch gear 26 and the pulleys 25 rotate in the direction opposite to the direction as mentioned above. Then, the clutch spring 24 also rotates in the direction opposite to the direction as mentioned above, so that the clutch gear 31 and the rotary shaft 32 move to the right along the guide hole 11g while moving the clutch arm 33 to rotate in the counterclockwise direction.

Since the clutch pawl 34 rotates in the clockwise direction when the clutch arm 33 rotates in the counterclockwise direction, the clutch pawl 34 moves to a position where the clutch pawl 34 does not engage the ratchet teeth 19b. Therefore, the ring member 19 becomes free to block the low-speed and high-torque transmission passage.

When the clutch gear 31 and the rotary shaft 32 reach the highest position, the clutch gear 31 engages the external teeth 17b of the carrier gear 17 to temporally set the low reduction ratio transmission mode shown in FIG. 5. Since the clutch gear 31 and the rotary shaft 32 move toward the right, the clutch gear 31 disengages from the external teeth 17b and runs idle. Accordingly, the high-speed and low-torque transmission passage is temporally established and immediately blocked. Since the motor 6 rotates in a reverse direction when the high-speed and low-torque transmission passage is temporally established, the spool 4 temporally rotates in the belt unwinding direction α and immediately stops.

When the clutch pawl 34 contacts the right end of the guide hole 11g, the clutch pawl 34 does not move further, so that the clutch gear 31, the rotary shaft 32, and the clutch spring 24 stop. Therefore, the clutch gear 31 and the rotary shaft 32 are set at the right-most position shown in FIG. 4. Accordingly, the power transmission mechanism 8 is switched from the high reduction ratio transmission mode to the power transmission blocking mode, so that the power transmission mechanism 8 is set in the power transmission blocking mode.

In the embodiment, the seat belt retractor 1 has the following seven modes of the seat belt 3.

(1) Belt Storage Mode

The belt storage mode is a mode in which the seat belt 3 is not used and is fully wound on the spool 4. In the seat belt retractor 1 set in the belt storage mode, the motor 6 is not driven and the power transmission mechanism 8 is set in the power transmission blocking mode. Therefore, very slight belt tension acts on the seat belt 3 (described later in the description about a belt-winding mode for storage) and the power consumption is zero.

(2) Belt-unwinding Mode

The belt-unwinding mode is a mode in which the seat belt 3 is withdrawn from the spool 4 for wearing the seat belt 3. In the seat belt retractor 1 set in the belt-unwinding mode, the power transmission mechanism 8 is set in the power transmission blocking mode. Therefore, small force is enough for withdrawing the seat belt 3. In this mode, the motor 6 is not driven and the power consumption is zero.

(3) Belt-winding Mode for Fitting

The belt-winding mode for fitting is a mode in which an excessively withdrawn amount of the seat belt 3 is rewound to fit the seat belt 3 to an occupant. The belt-winding mode is operated after the seat belt 3 is withdrawn and the tongue is inserted into and latched with the buckle to turn on the buckle switch, or when the occupant moves from the normal used state of the seat belt 3 (buckle switch is ON) so that a given amount of the seat belt 3 is withdrawn and then the occupant returns to the normal used state. In the seat belt retractor 1 set in the belt-winding mode for fitting, the motor 6 is driven in the belt winding direction and the power transmission mechanism 8 is set in the low reduction ratio transmission mode. Therefore, the seat belt 3 is rapidly wound with low torque and the motor 6 is stopped with a very small belt tension, thereby fitting the seat belt 3 to the occupant.

(4) Normal Use Mode (Comfort Mode)

The normal use mode (comfort mode) is a mode in which the seat belt 3 is in the normal used state, and is set after the belt-winding mode for fitting is completed. In the seat belt retractor 1 set in the normal use mode, the motor 6 is not driven and the power transmission mechanism 8 is set in the power transmission blocking mode. Therefore, very small tension acts on the seat belt 3 so that the occupant does not feel discomfort even with the seat belt 3 being put on. In addition, the power consumption is zero.

(5) Warning Mode

The warning mode is a mode in which the driver's doze or an obstacle in front of the vehicle is detected in the normal use mode, so that the winding action of the seat belt 3 is repeated for a predetermined number of times so as to warn the driver. When the seat belt retractor 1 set in the warning mode, the motor 6 is set to drive repeatedly. Therefore, relatively large tension (smaller than the belt tension in an emergency mode, described later) and very small tension are alternately applied to the seat belt 3, so that the driver is warned to the doze or the obstacle in front of the vehicle.

(6) Emergency Mode

The emergency mode is a mode to be set when the vehicle is highly in danger of colliding with an obstacle in the normal use mode, and comprises the following two steps.

(i) Initial Stage

In the initial stage of the emergency mode, the motor 6 of the seat belt retractor 1 rotates in the normal direction with relatively high rotational torque. Accordingly, from the power transmission blocking mode, the clutch spring 24 rotates to move the clutch gear 31 and the rotary shaft 32 to the aforementioned highest position, so that the clutch gear 31 engages the external teeth 17b of the carrier gear 17. At this moment, the slack of the seat belt 3 is removed and the tension on the seat belt 3 is smaller than the predetermined value. Accordingly, the resistance from the carrier gear 17 to the clutch gear 31 is relatively small. Even when the rotational torque of the motor 6 is relatively high, the rotary shaft 32 does not move the clutch arm 33 to rotate, so that the power transmission mechanism 8 is set in the low reduction ratio transmission mode. Therefore, the rotation of the clutch gear 31 is transmitted to the carrier gear 17 to rotate the carrier gear 17, so that the seat belt 3 is rapidly wound up with the low torque to rapidly remove the slack of the seat belt 3.

(ii) Late Stage

When the slack of the seat belt 3 is removed in the aforementioned initial stage, the emergency mode proceeds to the late stage from the initial stage. In the late stage, the tension of the seat belt exceeds the predetermined value, and the resistance applied to the clutch gear 31 from the carrier gear 17 becomes relatively large, so that the carrier gear 17 and the clutch gear 31 no longer rotate. However, since the lower-side connecting gear 26 is tried to rotate by the rotational torque of the motor 6, force is applied to the rotary shaft 32 in the direction toward the left-most position by the rotational torque of the lower-side connecting gear 26. At this point, the rotational torque of the motor 6 is relatively high. Accordingly, the moment for moving the clutch arm 33 to rotate in the clockwise direction by the pressing force of the rotary shaft 32 is larger than the moment against the moment in the clockwise direction by the engaging force between the engaging portion 33e and the concave portion 35b.

As a result, the engaging portion 33e of the clutch arm 33 disengages from the concave portion 35b of the friction spring 35, so that the rotary shaft 32 moves to the aforementioned left-most position while the rotary shaft 32 drives the clutch arm 33 to rotate. While the clutch arm 33 rotates, the clutch pawl 34 rotates so that the engaging hook 34b of the clutch pawl 34 engages the ratchet teeth 19b, thereby stopping the rotation of the ring member 19. Accordingly, the power transmission mechanism 8 is set in the high reduction ratio transmission mode. Therefore, the seat belt 3 is wound up with high torque so as to restrain the occupant with extremely large belt tension.

(7) Belt-winding Mode for Storage

The belt-winding mode for storage is a mode in which the seat belt 3 is fully wound up so as to store the seat belt 3 when the buckle switch is turned off by pulling the tongue off the buckle for taking off the seat belt 3. In the seat belt retractor 1 set in the belt-winding mode for storage, the motor 6 is driven to rotate in the belt winding direction with relatively low rotational torque, and the power transmission mechanism 8 is set in the low-ratio speed reduction transmission mode. Therefore, the seat belt 3 withdrawn is rapidly wound up with low torque. The seat belt 3 is fully wound up and the motor 6 is stopped when a very small belt tension is caused, so that the seat belt 3 is set in the belt storage mode with very small belt tension on the seat belt 3.

In the seat belt retractor 1 of the embodiment having the aforementioned structure, the power transmission mechanism 8 has the two power transmission passages, i.e. the low reduction ratio transmission mode composed of the high-speed and low-torque power transmission passages and the high reduction ratio transmission mode composed of the low-speed and high-torque power transmission passages, thereby achieving the two winding modes, i.e. rapidly winding up the seat belt for removing the slack of the seat belt 3 and for winding up the seat belt with high torque for restraining the occupant according in the high reduction ratio transmission mode.

In addition, the two power transmission passages are provided, thereby efficiently transmitting the rotational torque of the motor 6 to the spool 4 and performing the two winding performances with limited power consumption. In particular, the seat belt is wound with the high torque for restraining the occupant at the low-speed through the high-torque power transmission passage, thereby reducing the rotational torque of the motor 6 as compared with a conventional device. Accordingly, it is possible to reduce the power consumption of the motor 6 and use a smaller motor, thereby making the seat belt retractor 1 compact.

The two winding modes provide the seat belt retractor 1 with a function of pre-tensioning with the rotational torque of the motor 6, thereby eliminating a pretensioner using reaction gas in a conventional seat belt retractor and reducing cost.

The power transmission mechanism 8 is set in the low reduction ratio transmission mode or the high reduction ratio transmission mode according to the tension of the seat belt 3. Accordingly, it is easy to switch the modes without controlling the rotational torque of the motor 6. Further, the power transmission mechanism 8 has the power transmission blocking mode in which the rotational torque of the motor 6 is not transmitted to the spool. Accordingly, the withdrawing of the seat belt 3, the normal use of the seat belt 3 without discomfort for the occupant, and the storage of the seat belt 3 when not used can be conducted without an influence of the motor 6.

Furthermore, since the winding action for storing the seat belt 3 is conducted only by the rotational torque of the motor 6, it is possible to eliminate or set the urging force of the winding means such as a spiral spring in the belt winding direction always acting on the seat belt 3 at a very small level without an additional module such as a tension reducer. In this case, even when the urging force by the winding means is set in a minimum range for fitting the seat belt 3 to the occupant when the occupant puts on the seat belt 3, the rotation of the motor 6 is transmitted to the spool 4 in the low reduction ratio transmission mode so as to assist the winding of the seat belt 3, thereby securely winding the seat belt 3 for storing.

Since the high-ration speed reduction mechanism 7a is composed of the planetary gear train, the low-speed and high-torque transmission passage can be made small. Therefore, even though the power transmission mechanism 8 has both the low reduction ratio transmission mode and the high reduction ratio transmission mode, it is possible to reduce the size of the seat belt retractor 1.

Further, since the carrier of the high reduction ratio mechanism 7a and the external teeth 17b of the low reduction ratio mechanism 7b are composed of the single common carrier gear 17, the number of parts can be reduced, thereby making the seat belt retractor compact. The power transmission mode switching mechanism 9 controls the rotation of the internal gear 19a of the planetary gear train and the engagement between the clutch gear 31 with a small diameter and the external teeth 17b of the carrier gear 17 with a large diameter according to the tension of the seat belt 3, thereby making it easy to switch the power transmission modes.

When the power transmission modes are switched, it is possible to use another mechanism such as a solenoid as disclosed in Japanese Patent Publication (Kokai) No. 2000-177535 instead of the power transmission mode switching mechanism 9 using the two torques of the motor 6, i.e. the low torque and the high torque. It is not necessary to form the carrier of the high reduction ratio mechanism 7a and the external teeth 17b of the low reduction ratio mechanism 7b with the single common carrier gear 17, and form with separate parts.

The rotational torque of the motor 6 is constant when the power transmission modes are switched as mentioned above. Alternatively, the rotational torque of the motor 6 may be changed according to the mode among the belt-winding mode for fitting, the warning mode, the emergency mode, and the belt-winding mode for storage.

As described above, according to the seat belt retractor of the embodiment of the present invention, the power transmission mechanism has the high-speed and low-torque power transmission passage, so that the rotational torque of the motor is transmitted to the spool at a high speed and with low torque or at a low speed and with high torque. Therefore, it is possible to quickly wind the belt for removing the slack of the seat belt through the belt winding action of the spool at a high speed and with low torque, and wind the belt for restraining the occupant with high torque through the belt winding action of the spool at low speed and with high torque.

The seat belt retractor responds in a flexible and effective manner through the two winding modes without a fine control system for controlling the rotational torque of the motor according to the performance required for winding up the seat belt.

With the two power transmission passages, it is possible to efficiently transmit the rotational torque of the motor to the spool, thereby ensuring the two winding performances even with limited power consumption. Since the seat belt is wound with high torque for restraining the occupant through the low-speed and high-torque power transmission passage, the rotational torque of the motor required is smaller than that of the conventional device, thereby reducing the power consumption of the motor and making it possible to use a smaller motor. Therefore, the seat belt retractor can be made compact.

With the two winding performances, it is possible to provide the seat belt retractor with the function of pre-tensioning with the rotational torque of the motor, thereby eliminating a pretensioner using reaction gas in the conventional seat belt retractor and reducing the cost.

In the seat belt retractor according to the second, third, fifth and sixth aspects of the invention, the-power transmission mechanism is set in the low reduction ratio transmission mode or in the high reduction ratio transmission mode according to the tension of the seat belt, thereby making it easy to switch the modes without controlling the rotational torque of the motor.

According to the fourth aspect of the invention, the power transmission mechanism has the power transmission blocking mode in which the rotational torque of the motor is not transmitted to the spool, so that the withdrawing of the seat belt, the normal use of the seat belt without discomfort for the occupant, and the storage of the seat belt when not used can be conducted without an influence of the motor.

According to the seventh aspect of the invention, the high reduction ratio mechanism is composed of the planetary gear train, thereby reducing the sizes of the low-speed and high-torque transmission passage. Therefore, even though the power transmission mechanism has the low reduction ratio transmission mode and the high reduction ratio transmission mode, it is possible to effectively reduce the size of the seat belt retractor.

According to the eighth aspect of the invention, a part of the components of the low reduction ratio mechanism and a part of the components of the high reduction ratio mechanism are composed of the common part, thereby reducing the number of parts and making the seat belt retractor compact.

According to the ninth aspect of the invention, the power transmission mode switching mechanism controls the rotation of the internal gear of the planetary gear train and the engagement between the small-diameter gear and the large-diameter gear, thereby making it easy to switch the power transmission modes.

The seat belt retractor of the present invention is applicable to a seat belt device installed in a seat of a vehicle such as an automobile for restraining and protecting an occupant.

Figure 7:
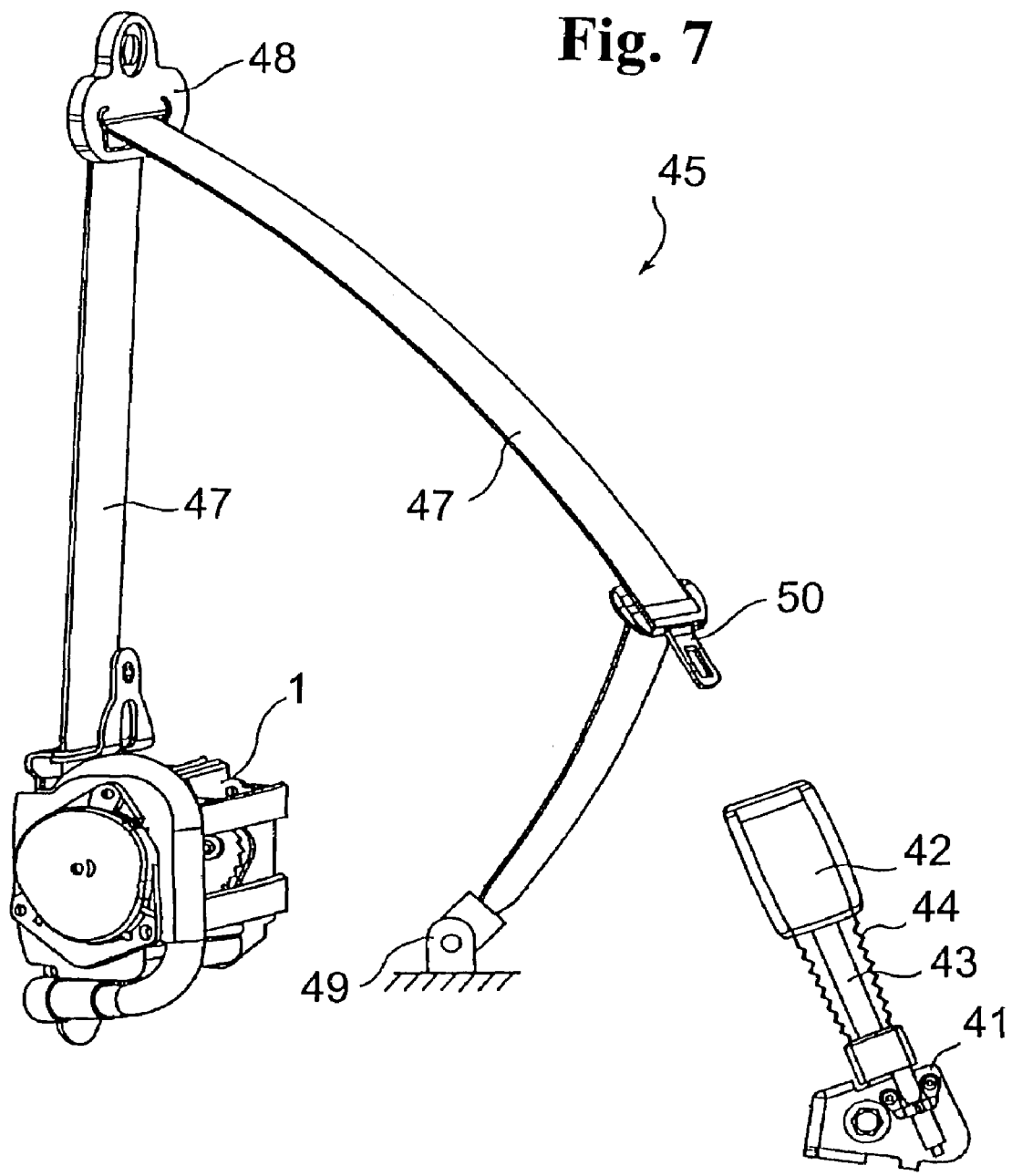
FIG. 7 is a view showing a seat belt device provided with the seat belt retractor shown in FIG. 1.

FIG. 7 is a view showing a seat belt device provided with the seat belt retractor 1 shown in FIG. 1. As shown in FIG. 7, a seat belt device 45 includes the seat belt retractor 1 fixed to a portion of a vehicle body such as a vehicle floor and the like; a belt guide 48 attached to a portion of the vehicle body such as a center pillar and the like for guiding a seat belt 47 extending from the seat belt retractor 1 into a predetermined position relative to an occupant; an anchor 49 fixed to a portion of the vehicle body such as a floor and the like on an outer side of a vehicle seat and to which an end of the seat belt 47 is connected; a tongue 50 slidably supported to the seat belt 47; a buckle 42 fixed to a portion of the vehicle body such as a floor and the like on an inner side of the vehicle seat and to which the tongue 50 can be latched; a buckle supporting member 41 for supporting the buckle 42; a connecting member 43 connecting the buckle supporting member 41 and the buckle 42; and a boot 44 disposed between the buckle 42 and the buckle supporting member 41.

While the invention has been explained with reference to the specific embodiments of the invention, the explanation is illustrative and the invention is limited only by the appended claims.

What is claimed is:

1. A seat belt retractor for winding a seat belt, comprising:
a spool for winding the seat belt,
a motor for generating rotational torque to rotate the spool,
a power transmission mechanism for transmitting the rotational torque of the motor to the spool to wind the seat belt onto the spool, said power transmission mechanism having a low reduction ratio mechanism for transmitting the rotational torque of the motor to the spool in a low reduction ratio transmission mode, a high reduction ratio mechanism for transmitting the rotational torque of the motor to the spool in a high reduction ratio transmission mode, and a power transmission blocking mode which disconnects a path from the motor to the spool to prevent transmission of the rotational torque of the motor to the spool, and
a power transmission mode switching mechanism for switching the power transmission mechanism in one of the low reduction ratio transmission mode, the high reduction ratio transmission mode and the power transmission blocking mode,
wherein said power transmission mode switching mechanism switches the power transmission mechanism in one of the low reduction ratio transmission mode and the high reduction ratio transmission mode according to tension of the seat belt, and switches the power transmission mechanism in one of the low and high reduction ratio transmission modes to the power transmission blocking mode when the motor rotates in a direction of unwinding the seat belt,
wherein said power transmission mode switching mechanism switches the power transmission mechanism to the low reduction ratio transmission mode when the tension of the seat belt is smaller than a predetermined value, and switches the power transmission mechanism to the high reduction ratio transmission mode when the tension of the seat belt is greater than the predetermined value, and
wherein said power transmission mode switching mechanism comprises a clutch gear having external teeth, a rotary shaft for rotationally supporting the clutch gear, a clutch arm pivotally supported on a frame and having a supporting groove capable of supporting the rotary shaft along the supporting groove, and a friction spring formed on the frame and engageable with the clutch arm.

2. A seat belt retractor according to claim 1, wherein said clutch arm moves the clutch gear between the high and low reduction ratio transmission modes.

* * * * *